United States Patent [19]

Wardell, Jr.

[11] Patent Number: 4,504,430
[45] Date of Patent: Mar. 12, 1985

[54] METHOD FOR CASTING A BASE DIRECTLY ON AN ELECTRON TUBE

[75] Inventor: Myron H. Wardell, Jr., Lititz, Pa.

[73] Assignee: RCA Corporation, New York, N.Y.

[21] Appl. No.: 495,118

[22] Filed: May 16, 1983

[51] Int. Cl.³ .................. B29D 27/00; B29F 1/10
[52] U.S. Cl. .................. 264/46.4; 264/46.7; 264/51; 264/272.15; 264/272.16; 264/328.1; 264/DIG. 83; 425/127; 425/589; 425/817 R
[58] Field of Search ............ 264/272.16, 53, 272.15, 264/46.4, 46.7, 328.1, 51, DIG. 83; 425/127, 817 R, 589

[56] References Cited

U.S. PATENT DOCUMENTS

| | | | |
|---|---|---|---|
| 2,163,177 | 6/1939 | Novotny | 264/272.16 X |
| 2,424,990 | 8/1947 | Krim | 250/27.5 |
| 2,433,373 | 12/1947 | Krim | 18/36 |
| 3,417,448 | 12/1968 | Kelley | 264/272.16 X |
| 4,148,541 | 4/1979 | Marks | 339/144 |
| 4,179,540 | 12/1979 | Smarook | 264/53 X |
| 4,345,812 | 8/1982 | Wardell, Jr. | 339/144 |

Primary Examiner—Philip Anderson
Attorney, Agent, or Firm—E. M. Whitacre; D. H. Irlbeck; L. Greenspan

[57] ABSTRACT

Method for casting a base directly on an electron tube comprising a stem and stem leads sealed in and extending out from the stem includes: A. detachably coupling a mold to the leads and stem, B. producing a temporary pressure seal between the mold and the stem including applying static pressure in a direction that is substantially normal to the surface of the stem and C. injecting liquid castable material into the mold at substantial hydraulic pressure while maintaining the static pressure at the temporary seal.

13 Claims, 5 Drawing Figures

METHOD FOR CASTING A BASE DIRECTLY ON AN ELECTRON TUBE

BACKGROUND OF THE INVENTION

This invention relates to a novel method for casting a base directly on an electron tube and particularly to producing the base by injection molding.

Many types of electron tubes, such as television picture tubes, comprise an evacuated envelope including a stem and an array of relatively-stiff stem leads sealed in, and extending out from, the stem. Typically, the stem is a circular glass disc having a central opening from which the exhaust tubulation extends and a circular array of stem leads around the tubulation.

It is common practice to attach a prefabricated base, usually of some type of plastic material, over the stem with the stem leads extending therethrough where it is held by friction or with an adhesive. Where one or more leads are to carry relatively high voltages, the lead may be surrounded by a dielectric material to suppress interelectrode arcing. The prefabricated bases are usually assembled to the stems manually, a process that often leads to high cost and great variation in quality.

It has been suggested in U.S. Pat. No. 2,433,373 issued Dec. 30, 1947 to N. B. Krim to cast the base directly to the stem by injection molding. That prior method provides a mold with a temporary pressure seal radially around the tube above the glass stem in order to prevent leakage from the pressure of the injection molding material. Soft leads that extend from the stem attach to stiff leads that are mounted in an auxiliary plate. The stiff leads are inserted in bores in the mold during molding. With this arrangement, little or no stress is applied to the stem through the leads when the pressure seal is applied. However, this prior method is relatively slow, is laborious, uses excessive casting material and requires a special arrangement of base leads. The novel method is faster, can be practiced with an automatic or semiautomatic machine, uses substantially less casting material, and can be practiced on electron tubes having stiff stem leads extending from the stem of the tube. The novel method also overcomes the problem of producing a pressure seal over protuberances which may have been produced when the neck-to-stem seal was formed.

SUMMARY OF THE INVENTION

The novel method for casting a base directly on an electron tube comprising a stem and stem leads sealed in and extending out from said stem includes A. detachably coupling a mold to said leads and said stem, the mold and stem substantially defining a chamber for casting the base, B. producing a temporary pressure seal between the mold and the stem including applying static pressure therebetween in a direction that is substantially perpendicular to the stem surface, C. and injecting liquid castable material into said chamber at substantial hydraulic pressure while maintaining the static pressure on the temporary seal.

By constituting the temporary pressure seal between the mold and the stem (instead of the neck of the tube), and by applying the static pressure to the seal longitudinally (instead of radially), the temporary pressure seal may be produced rapidly by machine without stressing the stem through the leads. The mold may include a gasket of compressible material opposite the perimeter of the stem. When the static pressure is applied, the gasket conforms to any variation in spacing between the mold and the stem. The novel method is economical of casting material, can be easily adapted to many stem lead arrangements, and produces bases of substantially uniform high quality.

DETAILED DESCRIPTION OF THE PREFERRED EMBODIMENT

Figure 1:
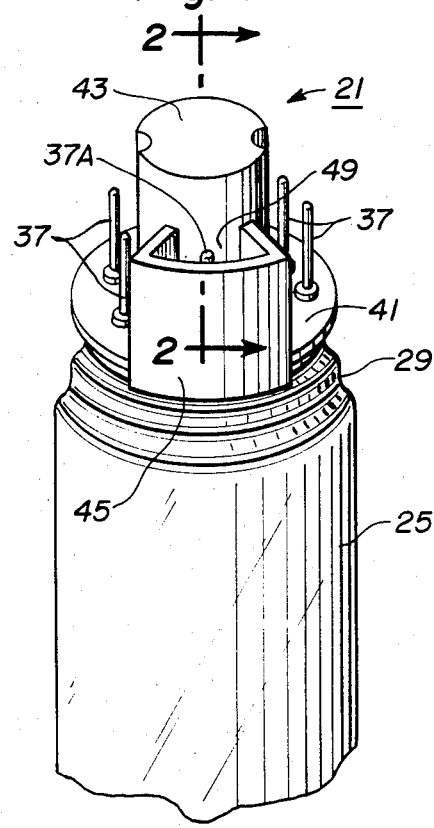
FIGS. 1 and 2 are respectively a perspective view and a broken-away elevational view of the stem-containing portion of a CRT (cathode-ray tube) having a cast-in-place base prepared by the novel method.
Figure 2:
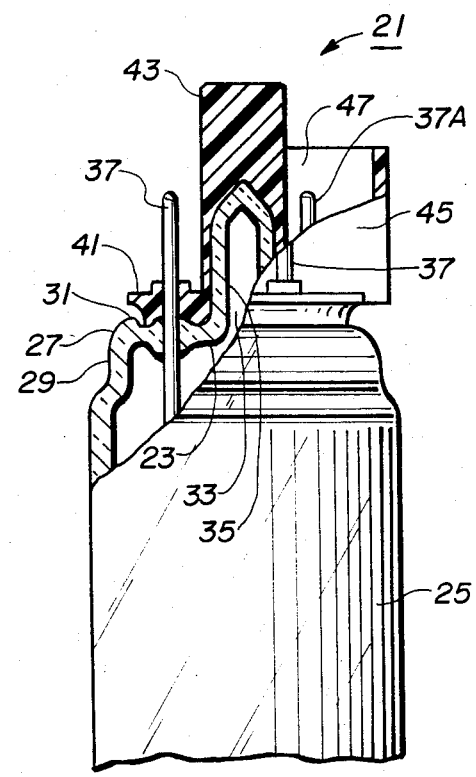

FIGS. 1 and 2 show a cast-in-place base 21 that was prepared by the novel method. The base 21 is cast on the glass stem 23 of the glass envelope of a CRT. During the fabrication of the CRT, a portion of the cylindrical glass neck 25 was melted and collapsed upon the stem 23 forming the neck-to-stem seal 27. Some characteristics of the neck-to-stem seal are (a) the indented portion 29 of the neck 25 which has a smaller outside diameter than that of the neck 25 and (b) occasional protuberances 31 perpendicular to the stem surface which are produced when excess neck glass is cut off. These protuberances 31 are fire-polished and ordinarily vary in height up to about 0.1 mm (40 mils) above the main surface of the stem 23. The stem 23 has a central aperture 33. A glass tubulation 35, through which the CRT was evacuated of gas to very low gas pressure, is attached to the stem 23 around the aperture 33. A plurality of relatively-stiff metal stem leads 37 is sealed into and extends through and outwardly from the stem 23. One particular stem lead 37A is connected to a focusing electrode inside the CRT and is dedicated to carry a relatively-high voltage. The stem leads 37 and 37A are arranged concentrically around the aperture 33 and the tubulation 35. The base 21 is comprised of a solid flange portion 41 against the outer surface of the stem 23, a solid cylinder portion 43 around the tubulation 35 and attached to the flange portion 41 at one end, and silo walls 45 attached to the flange portion at one end and to the cylinder portion 43 along the sides. The silo walls 45 and the cylinder portion 43 define a hollow chamber 47 open at the distal end around the dedicated lead 37A. All of the parts of the base 21 are integral with one another and are cast at the same time of a foamed polysulfone plastic material. While a particular arrangement of stem leads, a particular plastic material and a particular design of base are described, many other designs of bases can be made advantageously by the novel method. The described design is merely exemplary for the novel method. Also, any of a large number of organic polymeric materials may constitute the base 21.

Figure 3:
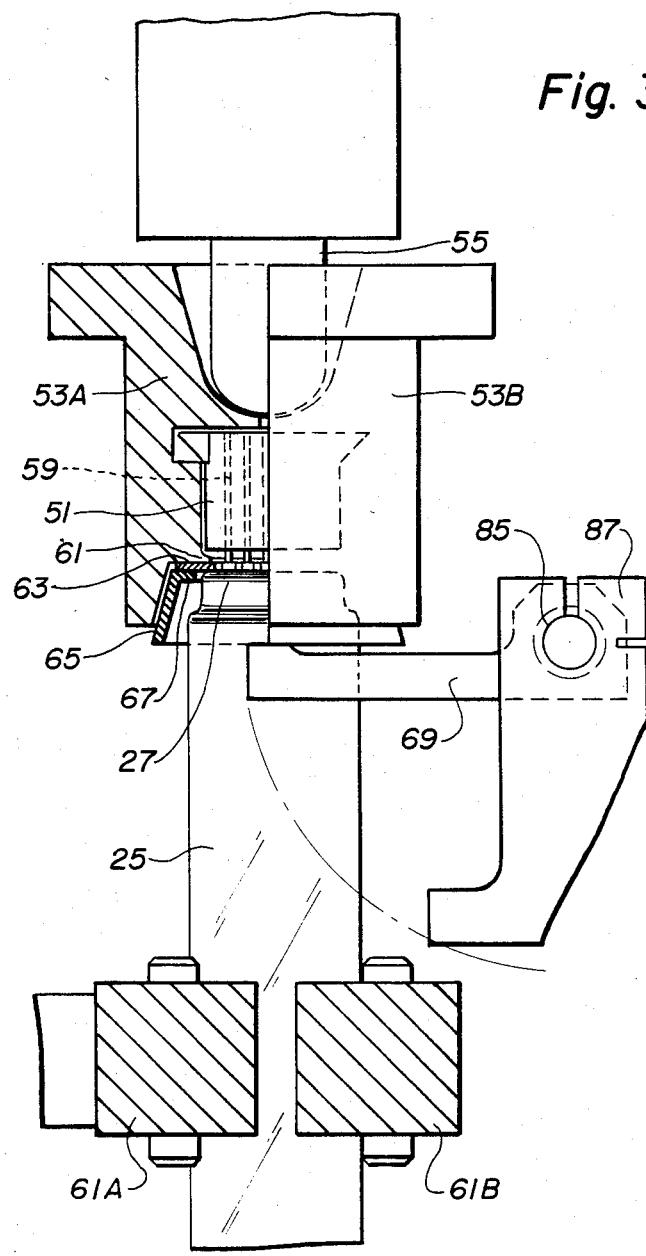
FIG. 3 is a partially-sectional elevational view of essential parts of an apparatus for practicing the novel method showing the stem-containing portion of a CRT in position just prior to injecting casting material into an attached mold.
Figure 4:
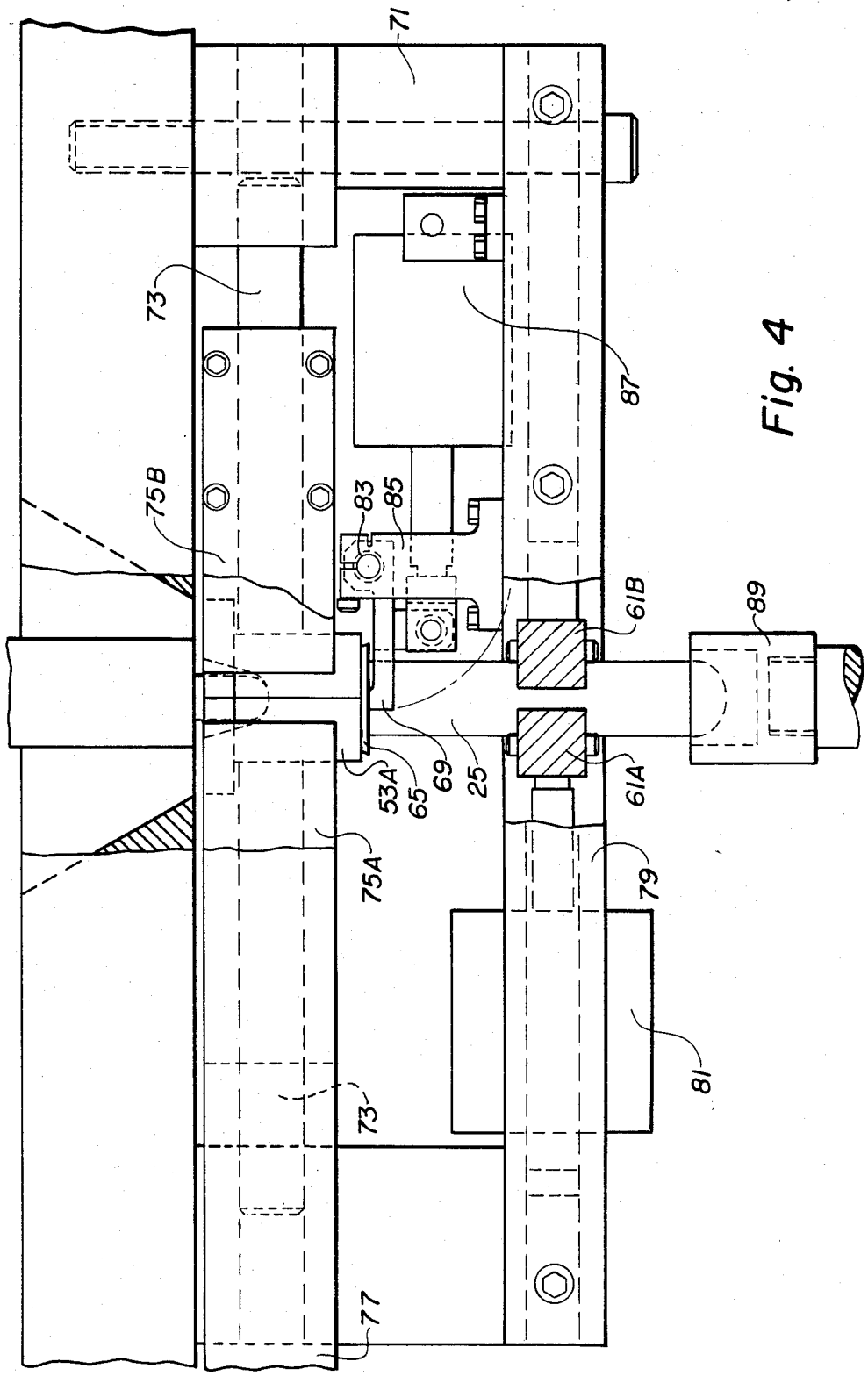
FIG. 4 is a partially broken-away elevational view of a key fragment of an apparatus for practicing the novel method including the parts shown in FIG. 3.

FIG. 3 shows essential parts of an apparatus for casting the base shown in FIGS. 1 and 2 directly on the stem 23 of a CRT by injection molding at the point just prior to injection of the cathode material. A fragment of the complete apparatus is shown in FIG. 4. The apparatus includes a cylindrical one-piece inner mold 51 and a two-piece outer mold 53A and 53B which together enclose the inner mold 51. The outer mold is cylindrical and split into two equal parts 53A and 53B along a plane towards the viewer. An injection nozzle 55 extends down into a matching recess 57 therefor in the outer mold parts 53A and 53B.

The inner mold 51 has matching bores 59 therein for receiving the stem leads 37 of a tube and also has suitably-shaped recesses for receiving the tubulation of the tube and for defining surfaces of the base to be cast. A tube with a neck 25 is shown in position with the stem leads 37 up and inserted in the bores 59 of the inner mold 51. The neck 25 is held in position by rubber-lined neck jaws 61A and 61B. The outer mold also has surfaces for defining surfaces of the base that is to be cast. The outer mold also has a circular lip 61 between the inner mold 51 and the stem 23 which extends inwardly a short distance. A ring-shaped gasket 63 is compressed between the lip 61 and the stem 23. A compression ring 65 between the outer mold part 53A and 53B has an inward-extending circular flange 67 which presses the gasket 63 against a recess in the bottom sides of the outer mold parts 53A and 53B, which pressure ring 65 is urged by the lever arms 69.

Thus, a temporary pressure seal is formed by the upward static pressure of about 100 to 600 pounds of the stem 27 and the pressure ring 65 against the gasket 63 which is counterbalanced by the downward static pressure on the gasket 63 by the outer mold parts 53A and 53B. The thickness of the gasket 63 is at least 1.5 times the height of the protuberances 31 on the stem 23. Typically, the gasket 63 is about 1.5 mm (60 mils) thick and has a compressibility of about Shore A-65. At compression, the gasket is compressed over the protuberances and leaves a small spacing of no more than 0.1 mm (4 mils) between the gasket 63 and the main surface of the stem 23, which provides an adequate pressure seal for injected material.

The inner mold 51, the outer mold parts 53A and 53B and the stem 23 define a chamber into which liquid castable material is injected at hydraulic pressures in the range of about 290 to 1740 kilograms per square centimeter (about 100 to 600 pounds per square inch). Such hydraulic pressures are resisted by the seal to prevent leakage by having no more than 0.1 mm (4 mils) clearance between the gasket 63 and the stem 23. The hydraulic pressure exerted on the stem 23 is resisted by the jaws 61A and 61B and/or the holding means 89. Lower static pressures are used with lower hydraulic pressures.

The novel method may be practiced with the apparatus shown in FIG. 4 which includes a frame 71, an upper slide 73 on which are mounted outer mold holders 75A and 75B to which are attached the outer mold parts 53A and 53B, and hydraulic means 77 for moving the outer mold parts 53A and 53B apart and together. The frame 71 also includes a lower slide 79 on which are mounted the two jaws 61A and 61B adapted for holding a glass neck 25, and pneumatic means 81 for moving the jaws 61A and 61B apart and together. The lever arm 69 is attached to and is rotatable around a shaft 83 which is mounted on a shaft support 85 on the frame 71. A pneumatic means 87 connected to the shaft 83 can rotate the lever arm 69 into and out of engagement with the pressure ring 65. The apparatus also includes a tube-holding means 89 for holding the tube, and moving means (not shown) for moving the tube-holding means up and down.

Figure 5:
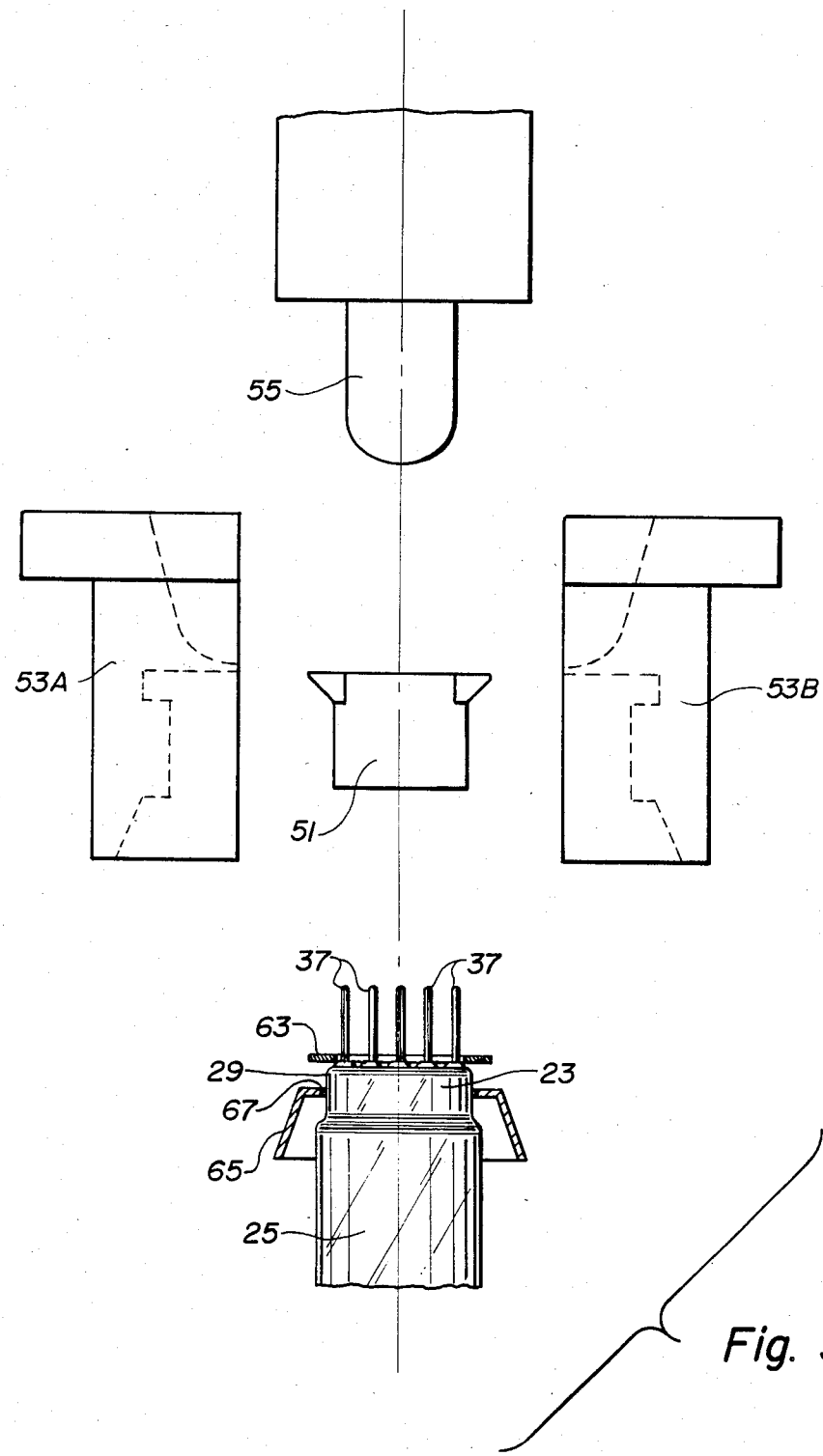
FIG. 5 is an elevational view of parts shown in FIG. 3 at the start of an embodiment of the novel method.

The apparatus shown in FIGS. 3 and 4 may be operated in the following manner. In the starting position, the nozzle 55 is raised, the tube-holding means 89 is lowered, the outer mold holders 75A and 75B and the outer mold parts 53A and 53B are apart and the jaws 81A and 81B are apart. Referring to FIGS. 4 and 5, a tube is positioned on the tube-holding means 89 with the neck 25 up. The pressure ring 65 is dropped over the neck where it rests in the recess 29. Then, the compression gasket 63 is dropped over the stem leads 37 where it rests on the stem. The inner mold 51 is placed on the stem leads 37. The bores 59 are about 2 mils larger in diameter than the stem leads. Since the injected castable material requires at least 4 mils clearance in order to flow through, this clearance provides an adequate seal around the stem leads 37.

The tube holder 89 and the tube are moved upward to the desired position for the stem 23. The outer mold parts 53A and 53B are moved together around the inner mold 51. This also positions the inner mold 51 with respect to the stem 23 and the outer mold. Next, the lever arm 69 is rotated into engagement with the pressure ring 65 so that the lip 67 presses the gasket 63 against the outer mold parts 53A and 53B. The tube holder 89 now moves upward positioning the stem 23 below the gasket 63 and pressing the protuberances 31 into the gasket 63 so that the maximum clearance between the stem 23 and the gasket 63 is no more than about 0.1 mm (4 mils), thereby forming the pressure seal. Ordinarily, the protuberances 31 would prevent the formation of an adequate seal. However, in the novel method, the combination of longitudinal pressure, the use of a compressible gasket and the permitted maximum clearance permit a practical seal to be made rapidly.

The jaws 61A and 61B move inward engaging and holding the tube in position. Next, the nozzle 55 is moved downward pressing on the outer mold parts 53A and 53B while the tube is held in position by the jaws 81A and 81B. All of the parts are now in the positions shown in FIG. 3. A controlled amount of castable material is injected through the nozzle 55 into the chamber formed by the mold parts and the stem 23, and held there for a sufficient time; e.g., about 60 seconds, at least until the injected material can maintain its shape. Following this, the nozzle 55 is raised, and all of the parts are returned to the starting position. Then, the inner mold 51 is slid upwards off the stem leads 37, and the gasket 63 and pressure ring 65 are removed, producing the base shown in FIGS. 1 and 2.

The plastic castable material needs a minimum clearance between surfaces in order to flow through therebetween. The maximum clearance, as between lead and bore, or between stem and gasket, to prevent leakage may be between 0.5 and 5.0 mils depending upon the viscosity and surface tension of the viscous casting material. Other factors may offset the minimum clearance that can be provided without leakage.

The castable material is preferably an organic polymeric material that is used for injection molding of parts. Such polymeric materials are heated to temperatures up to about 200° C. just prior to injection into the mold. Some suitable polymeric materials are polysulfones and polystyrenes. These materials can be foamed in the manner known in the art.

What is claimed is:

1. A method for casting a base directly on an electron tube, said tube comprising an envelope including a stem and relatively stiff stem leads sealed in and extending out from said stem, said method including
   A. detachably coupling a mold to said leads and said stem, said mold and said stem substantially defining a chamber for casting said base,
   B. producing a temporary pressure seal between said mold and said stem including applying static pressure therebetween in a direction that is substantially perpendicular to the surface of said stem surface,
   C. and injecting liquid castable material into said chamber at substantial hydraulic pressure while maintaining said static pressure.

2. The method defined in claim 1 wherein the largest transverse dimension of said chamber is less than the transverse dimension of said neck.

3. The method defined in claim 1 wherein said stem and said pressure seal are both circular in geometry.

4. The method defined in claim 1 wherein said mold includes a toroidal gasket of compressible material between said mold and said stem.

5. The method defined in claim 4 wherein said static pressure is in the range of 200 and 600 pounds.

6. The method defined in claim 5 wherein said hydraulic pressure is in the range of 100 to 600 pounds per square inch.

7. A method for casting a base directly on an electron tube, said tube comprising an envelope including a glass stem and relatively-stiff metal stem leads sealed in and extending out from said stem, said method including
   A. detachably coupling a mold to said leads and said stem, said mold and said stem substantially defining a chamber for casting said base,
   B. producing a temporary pressure seal between said mold and said stem including applying static pressure therebetween in a direction that is substantially perpendicular to the surface of said stem surface,
   C. and injecting liquid castable material into said chamber at substantial hydraulic pressure while maintaining said static pressure.

8. The method defined in claim 7 wherein said castable material is an organic composition that is injected at temperatures in the range of 20° to 375° C.

9. The method defined in claim 8 wherein said castable material is a polysulfone composition.

10. The method defined in claim 8 wherein said castable material is a foaming-type organic composition.

11. A method for casting a base directly on a vacuum electron tube, said tube comprising a cylindrical glass neck having a distal end, a circular glass stem sealed to and closing said neck at said distal end, and a plurality of relatively stiff metal leads sealed in and extending externally from said stem, said method comprising
   (a) sliding a mold into engagement with said stem with the extended portions of said leads substantially entirely buried in bores in said mold, said mold including a toroidal gasket of compressible material opposite the perimeter of said stem,
   (b) pressing said mold and said stem towards one another, thereby compressing said gasket, said mold and said stem defining a chamber for casting said base,
   (c) injecting a liquid organic polymeric castable material into said chamber at substantial hydraulic pressure while continuing to press said mold and stem towards one another,
   (d) continuing to press said mold and said stem towards one another after completing step (c) until said injected material has hardened sufficiently to maintain its cast shape, and then
   (e) sliding said mold out of engagement with said stem and said leads.

12. The method defined in claim 1 wherein said castable material is a foaming-type polysulfone composition.

13. The method defined in claim 11 wherein said seal between said neck and said stem includes external surface portions which are irregularly higher than the external surface of said stem, and said gasket has sufficient compressibility to seal to said irregularities.

* * * * *